Aug. 23, 1960   F. G. COMPTON ET AL   2,950,340
AIRCRAFT MONITORING SYSTEM
Filed Sept. 24, 1957   3 Sheets-Sheet 1

INVENTOR.
FRANK G. COMPTON
HERBERT J. CRUMP
BY
ATTORNEY

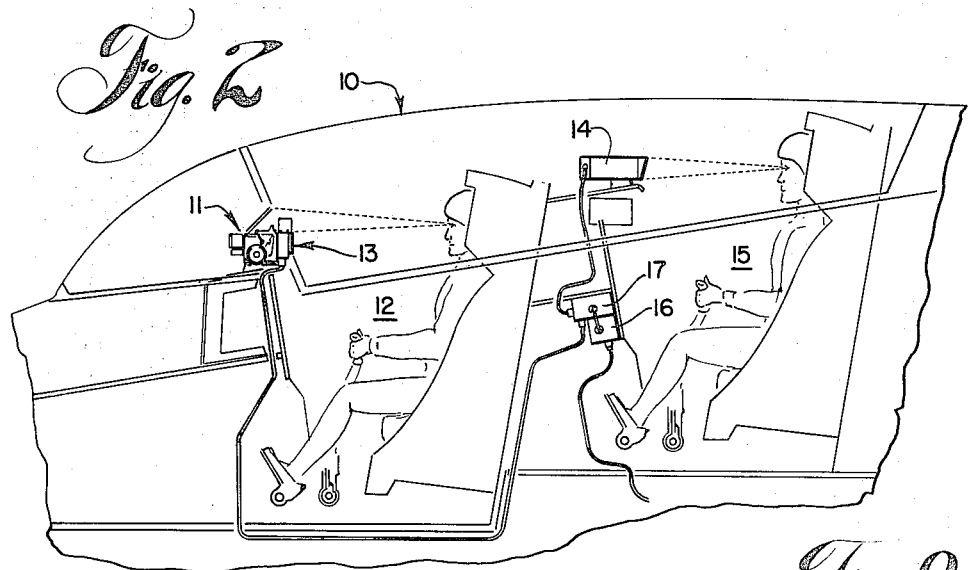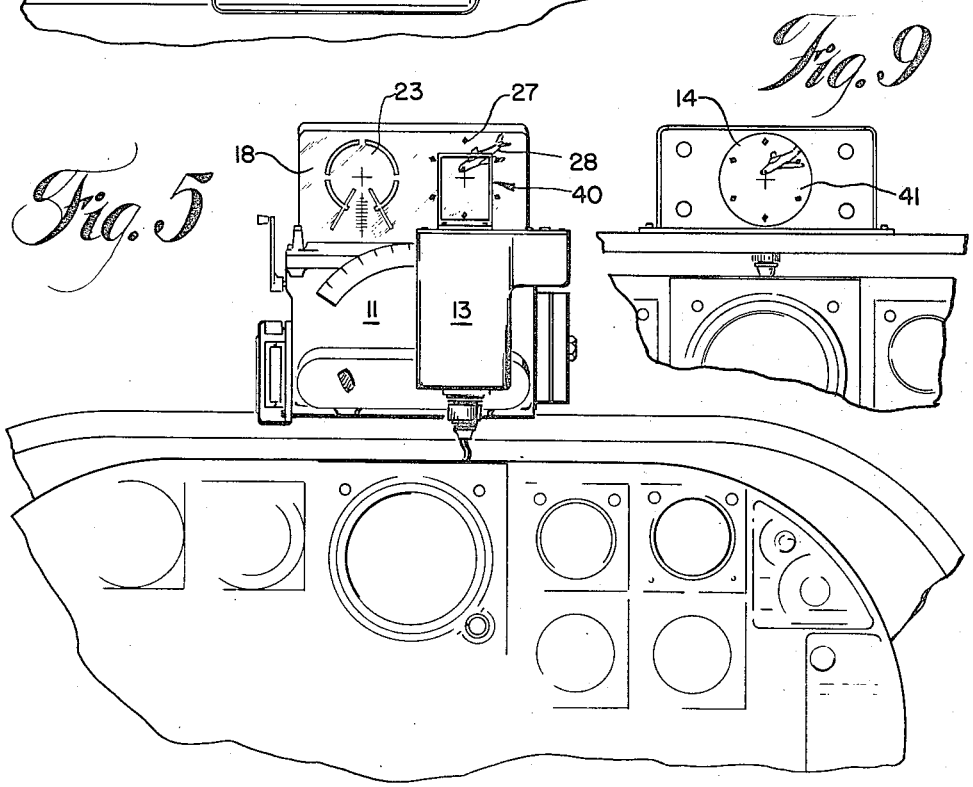

Aug. 23, 1960   F. G. COMPTON ET AL   2,950,340
AIRCRAFT MONITORING SYSTEM

Filed Sept. 24, 1957   3 Sheets-Sheet 3

INVENTOR.
FRANK G. COMPTON
HERBERT J. CRUMP
BY
ATTORNEY

United States Patent Office 2,950,340
Patented Aug. 23, 1960

2,950,340

AIRCRAFT MONITORING SYSTEM

Frank G. Compton and Herbert J. Crump, Columbus, Ohio, assignors to North American Aviation, Inc.

Filed Sept. 24, 1957, Ser. No. 685,979

6 Claims. (Cl. 178—6)

This invention relates generally to a monitoring system for aircraft and the like, and particularly pertains to an aircraft monitoring system which may be utilized to evaluate the orientation of an aircraft relative to a target or flight destination.

Heretofore, difficulties have been encountered with respect to known techniques for visually monitoring aircraft directional orientation relative to a target or the like, particularly when the monitoring effort is to be accomplished at a position removed distantly therefrom. As in conventional gunnery training methods, known monitoring methods often utilize a photographic approach wherein recording film taken from a gun camera is developed subsequent to the training exercise and effort evaluation of target-aircraft orientation is made thereafter by the instructor. Accordingly, an unnecessary time delay in evaluation is encountered.

To overcome the deficiencies associated with known monitoring systems, the system of this invention utilizes a reference configuration or sight mounted on an aircraft, and a television system associated with such configuration or sight. The vidicon unit of the television system is mounted in viewing relationship to the reference or sight, and a monitor unit which cooperates with the vidicon unit is placed distant therefrom. For example, the monitor unit may be ground-based, may be installed in a separate aircraft, or may be mounted in the same aircraft as is the sight. Further, the image of the sight or reference configuration displayed by the monitor unit may be utilized advantageously in the control of aircraft flight or in evaluation of the orientation of the incorporating aircraft relative to a target.

Accordingly, it is an object of our invention to provide an aircraft monitoring system which will effect a visual presentation of an aircraft relative to a target or flight destination.

Another object of this invention is to provide an aircraft monitoring system for flight orientation evaluation which may be used for either on-the-spot evaluation, air-to-air evaluation, or air-to-ground evaluation.

Another object of the present invention is to provide an aircraft monitoring system which may be utilized to realize an improved technique for gunnery training, bardment training, and the like.

Another object of this invention is to provide a form of aircraft monitoring system which may be utilized in aircraft having limited space available for installation.

A still further object of this invention is to provide an aircraft monitoring system which will convert collimated or substantially collimated images to non-collimated facsimiles thereof.

Another object of this invention is to provide an aircraft monitoring system which can be installed in an aircraft with a minimum of effort, which has minimum weight requirements for its required components, which lends itself to miniaturization, and which is comprised of rugged and extremely reliable components.

Other objects and advantages of this invention will become apparent during consideration of the drawings and detailed description portion of this specification.

In the drawings, wherein like numerals are utilized to reference like features throughout the same:

Fig. 2 is a sectional view of the system arrangement of Fig. 1;

Fig. 4 is a exploded view of the components of one form of a gunsight which may be utilized in the practice of this invention;

Fig. 5 is an elevation of the gun-sight and vidicon unit installation shown in Figs. 1 and 2;

Fig. 9 is a front elevation of the monitor unit shown in Figs. 1, 2, and 3.

Figure 1:
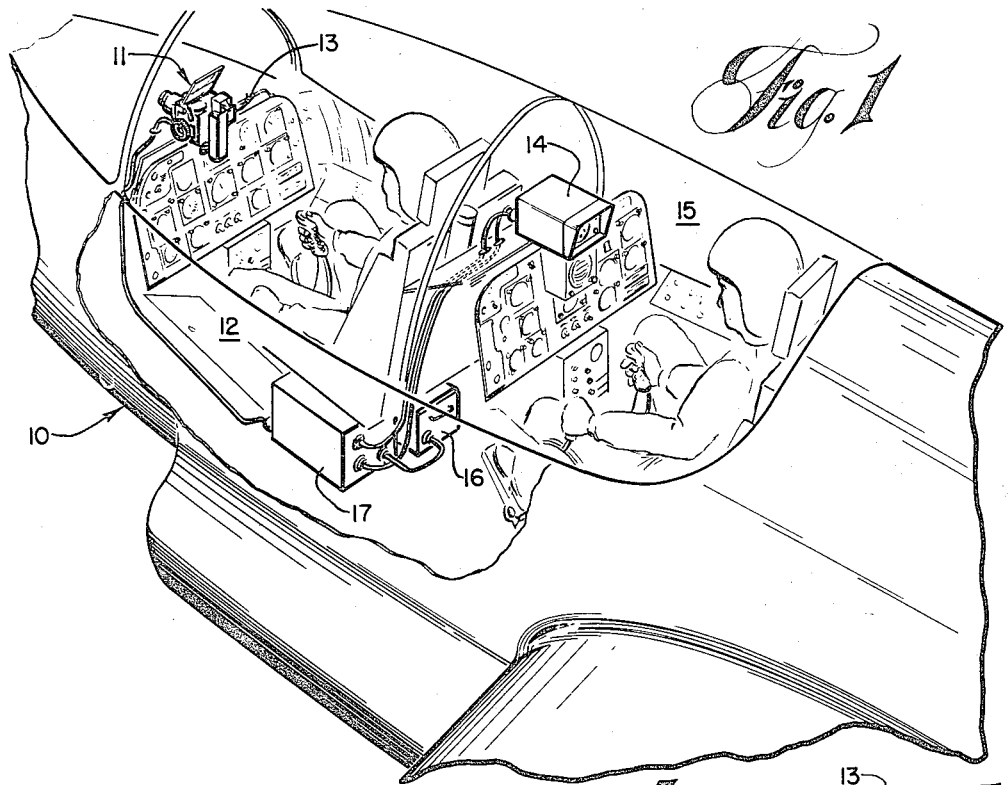
Fig. 1 is a perspective view of a portion of an aircraft showing one embodiment of the monitoring system of our invention installed therein.

The monitoring system of this invention is capable of numerous applications, and in the drawings the system components are illustrated in their proper relationship when installed in a trainer-type aircraft 10. However, as will hereinafter be noted, the system of our invention also has application with respect to other types of aircraft for guidance or flight orientation evaluation purposes. Essentially, the system is comprised of a reference configuration or sight mounted on the aircraft, and a television system associated wtih such configuration or sight. In Fig. 1 a gunsight 11 is shown mounted in the student's cockpit portion 12 of the trainer aircraft 10, and the television system is illustrated as being of the closed circuit type with its vidicon-optics unit 13 mounted in viewing relationship to the sight 11, with its monitor unit 14 mounted in the instructor's cockpit portion 15 of the aircraft in viewing relation to the instructor, and with its vidicon-optics unit connected to its monitor unit through a power unit 16 and control package 17. Fig. 2 presents a sectional view of the arrangement of Fig. 1.

Figure 3:
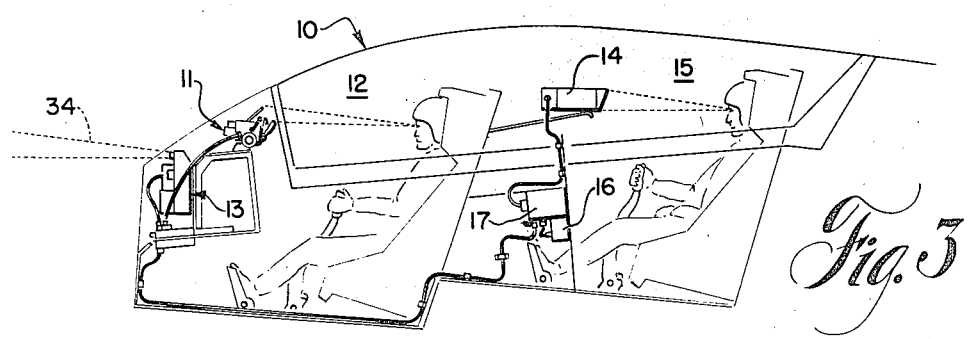
Fig. 3 is a sectional view showing another embodiment of the system of our invention installed in a trainer-type aircraft.

A sectional view of a similar arrangement is shown in Fig. 3 but with the form of vidicon-optics unit 13 modified as compared to the form of Figs. 1 and 2. The arrangement of Figs. 1 and 2 is preferably utilized when the escape envelope of the aircraft permits mounting of unit 13 directly on the sight 11, whereas the arrangement of Fig. 3 is utilized when escape envelope requirements are such that a substitute installation of the vidicon-optics unit is needed. As may be noted in Figs. 1, 2, and 3, the trainer aircraft seating arrangement for student and instructor does not permit direct visual monitoring of the gunsight 11 by the instructor. This condition also holds true for that type of trainer aircraft wherein student and instructor sit side-by-side.

A form of gunsight 11 which may readily be adapted to use in the practice of this invention is illustrated in detail in Fig. 4. As there shown, the gunsight is comprised of a transparent reflector plate 18, a fixed mirror 19, fixed reticle mirror 20, and movable reticle mirror 21. Movable mirror 21 is attached to a gyroscope contained in housing 22 and functions to move or translate a reticle image in response to movement of the gyroscope.

Fixed reticle image 23 originates with a light source 24 passed through the slits of fixed reticle card 25 and is collimated by lens 26 after being reflected from mirrors 20 and 19. Generally, the fixed reticle image 23 is boresighted to the guns of the aircraft and although appearing in the distance to the viewer of the sight reflector plate 18, it actually is reflected as a collimated image from that plate; reticle image 23 is used for reference purposes only.

Movable reticle image 27, shown in Fig. 4 as framing a target 28, originates with a light source 29 passed through the co-ordinated slits of span reticle card 30 and range reticle card 31 and is collimated by lens 32 after being reflected by mirrors 21 and 19. Image 27 likewise appears in the distance, but actually is reflected to the viewer from reflector plate 18 as a collimated image. Span reticle 30 is set by use of span lever 33 in accordance with the estimated wing span of target 28. Reticle card 31 and the gyroscope contained within housing 22 are movably positioned by radar and computer equipment (not shown) carried aboard the aircraft to provide proper range and lead information for the firing of the ship's guns.

Figures 6, 7:
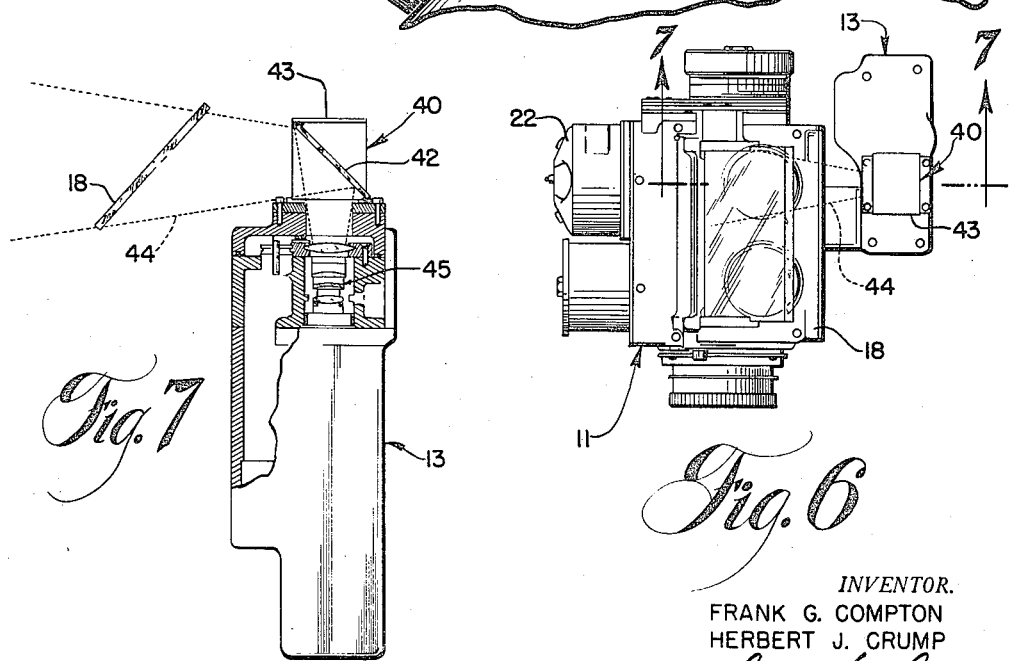
Fig. 6 is a plan view of the gun-sight and vidicon unit assembly portion of Figs. 1 and 2.
Fig. 7 is a sectional view taken substantially along the line 7—7 of Fig. 6.
Figure 1:
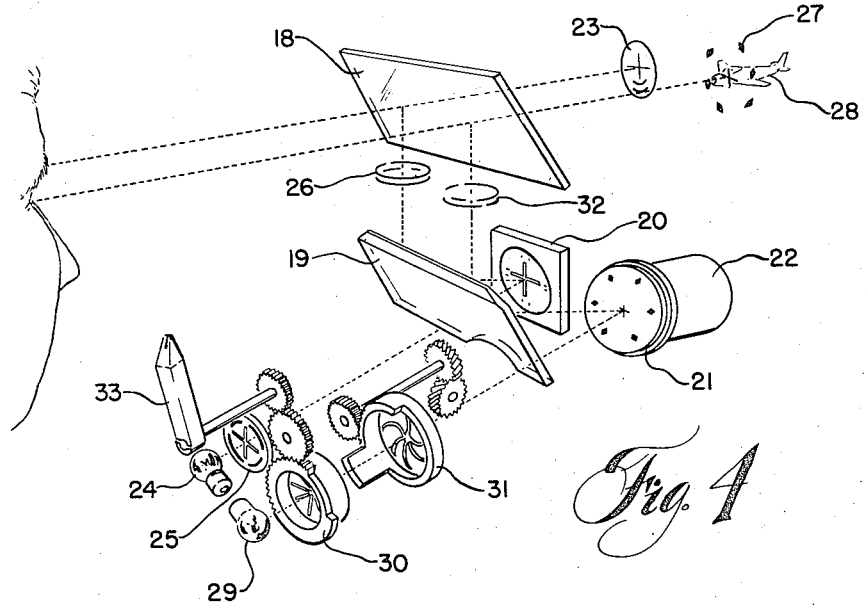

The system arrangement of Figs. 1 and 2 utilizes a vidicon-optics unit 13 mounted on the sight in viewing relationship to the movable reticle image 27 reflected from reflector plate 18. In this arrangement, wherein the system also views the target 28 through reflector plate 18, a vidicon-optics unit of proper size is mounted on the gunsight such that its beamsplitter, designated as 40 in Figs. 5, 6, and 7, is properly aligned with the center pip of the collimated movable reticle image 27. A student's view of this gunsight-vidicon unit assembly is illustrated in Fig. 5.

Details of the vidicon-optics unit 13 of Figs. 1, 2, and 5 are illustrated in Figs. 6 and 7. A beamsplitter 40, comprised of a transparent reflector plate 42 and a thin, lightweight frame 43, is provided in aligned relationship to the proper field of view (designated as 44 by dotted lines) for the center pip of reticle image 27. The image 27 on reflector plate 18, or a portion thereof, is captured by reflector plate 42 and reflected downward into the image reduction lens system 45 and into a vidicon or camera tube (not shown) contained within the housing of the vidicon-optics unit 13 in association with the optics system 45.

In its preferred form, the frame 43 of beamsplitter 40 will partially obstruct the pupil of the viewer's right eye only and hence, because both eyes will view the target, the frame will occasionally mask only portions of the reticle image. The beamsplitter reflector plate 42 should preferably have a transmittance value of 40 to 50 percent to have little effect on visibility of the viewer.

Figure 8:
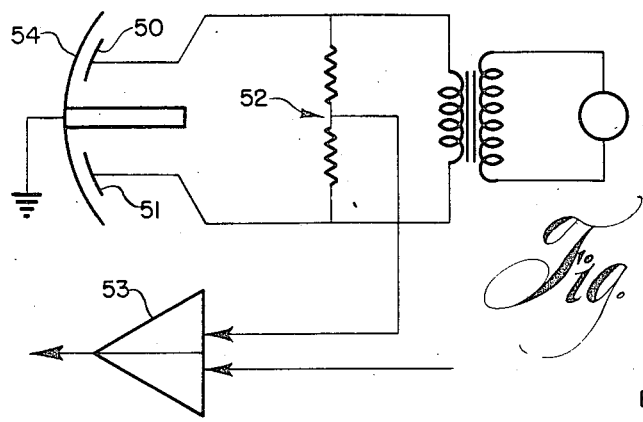
Fig. 8 is a schematic diagram of a gyroscope pick-off which may be utilized, in the practice of this invention, with the form of gun-sight illustrated in Fig. 4.

The vidicon-optics unit 13 of Fig. 3 views the target image area in periscope fashion through an optics system which functions as do features 40 and 45 of Fig. 7; generally, the field of view is designated by the numeral 34. In the unit 13 of Fig. 3 there is further imposed upon the target image, in proper relationship, a separate movable reticle image identical in configuration and proportion to the image 27 reflected by reflector plate 18. The separate means for producing this second or duplicate reticle image may be generally identical to components 29, 30, and 31 of Fig. 4, and are preferably adjusted for range and lead by the same devices as adjust elements 30 and 31. The composite reticle image may be movably positioned on the target image by servo motors made movably responsive to movement of the gyroscope used in the gunsight 11. A suitable scheme for use in slaving a servo motor to the gyroscope is illustrated by Fig. 8. A vidicon or camera tube (not shown) is positioned in viewing relationship to said target image and said slaved reticle image.

Angle pick-offs are utilized to accomplish the tie-in between gyroscope and servos. The various drive coils provided for the principal axes of the gyroscope are provided with segmental capacitance-type pick-offs, and such pick-offs are installed in insulating relationship to the range coils and to each other. However, opposed segments, each of which is shaped generally similar to a quadrant of a hemispherical surface, are paired and wired into a bridge circuit. In Fig. 8 a pair of capacitance pick-offs are designated by the numerals 50 and 51 and the bridge circuit is designated by the numeral 52. Bridge circuit 52 is connected electrically to amplifier 53 which in turn is connected to a servo motor (not shown) which drives the reticle cards for the second image or moves the second reticle image. As the gyroscope and gunsight 13 changes position, the gyrodome (designated schematically as 54) produces a differential change in capacitance between the segments 50 and 51 and the gyrodome, and thus provides an electrical signal proportional to angular displacement from its neutral position. The differential signal, after amplification, motivates a properly associated servo motor. This pick-off arrangement does not interfere at all with operation of the gunsight gyroscope.

The vidicon or camera tube used in the unit 13 may be preferably miniaturized to as little as one-half inch diameter and yet provide a proper degree of line resolution and light sensitivity. The optics used to reduce the size of the image 27 without distortion, may be additionally provided with a density wedge (not shown) for control of the tube face illumination level.

The vidicon-optics unit 13 is preferably provided in association with a video amplifier (not shown) to constitute the video portion of the monitor system of our invention. This video amplifier may typically be comprised of a pre-amplifier (in association with the vidicon-optics unit 13), a main amplifier (in association with the control package 17), and a final driving stage (located in the monitor unit 14).

Monitor unit 14 includes a display area 41, which constitutes the display surface of a cathode ray tube, and may additionally be comprised of deflection amplifiers, and a deflection amplifier high voltage power supply. Controls for brightness, on-off, etc. may also be provided in association with this unit. An instructor's view of the display area 41 of monitor unit 14 is illustrated in Fig. 9, and it is the same for the arrangement of Fig. 3 as well as for the arrangement of Figs. 1 and 2. The facsimilies of the reticle and target images displayed in area 41 are positioned as viewed by unit 13 and are non-collimated.

The power unit 16 drives the television system components and it is provided in association with the aircraft's electrical power system. The control package 17 may include such components (not shown) as a master oscillator, frequency dividers for vertical and horizontal sweeps, a blanking signal generator, deflection circuits, and sweep generators to thus provide a complete television system.

In operation of the system the image of a sight reticle (or other reference configuration) and the image contained in a target viewing area are viewed by vidicon unit 13, the images are then simultaneously transformed into an electronic signal and thereafter transmitted in that form to monitor unit 14. At the monitor unit 14 the signals are converted to non-collimated facsimile images and displayed in display area 41 in their proper relationship relative to each other.

As has been hereinbefore suggested, the monitoring system of this invention has application in trainer type aircraft in connection with air-to-air gunnery instruction and it likewise has application with respect to bombardier training. Heretofore it has been the common practice to film a student pilot's tracking efforts and then assess his efforts at a later time after the film from the gun cameras had been developed. On-the-spot corrective instruction proved impossible.

However, the system of this invention permits immediate assessment of student efforts while he is carrying out his gunnery efforts and corrective suggestions can be offered in a timely manner. This is made possible by the fact that the instructor is able to view the gunsight reticle simultaneously with the student and exactly as the student views it. For other instruction purposes, the student may occupy the instructor's position and vice versa so that the student can be shown, by the instructor, exactly how the task ought to be accomplished.

Likewise, the system of this invention might be used in other situations. If the closed circuit television system is altered to include a transmitter in association with the vidicon-optics unit and a receiver in association with the monitor unit, the monitor unit may be installed in a separate aircraft or may be based on the ground. Here again the system can be used for either training or evaluation purposes or it can be used to guide the aircraft containing the vidicon-optics unit to its destination or to orient it relative to a target.

It is to be understood that the forms of the invention herein shown and described are to be taken as preferred embodiments of the same, but that various changes in the shape and size of parts may be resorted to without departing from the spirit of the invention or the scope of the subjoined claims.

We claim:

1. In a trainer-type airplane, in combination: a first airplane cockpit, a gunsight mounted in said first cockpit and having a reticle image projected along a first line, a vidicon unit aligned with said first line and receiving said reticle image and establishing a corresponding electrical signal, a second airplane cockpit located near said first cockpit, a monitor unit converting each electrical signal received therein into a facsimile and displaying the facsimile in viewable relation to a person occupying said second cockpit, and means amplifying said vidicon unit electrical signal and transmitting the resulting amplified signal to said monitor unit, said monitor unit thereby displaying a facsimile of said gunsight reticle image to a person occupying said second cockpit portion for aid in instructing the person occupying said first cockpit portion during an aircraft gunnery training mission.

2. In a trailer-type airplane having cockpit portions for a student and for an instructor, the combination comprised of: a gunsight mounted in one of said cockpit portions and having a reticle image projected along a first line, a gunsight transparent reflector plate aligned with said first line and having a display which includes images of said gunsight reticle and of a target area and which is projected along a second line, a vidicon unit aligned with said second line and establishing an electrical signal corresponding to said gunsight reflector plate display, a monitor unit converting each electrical signal received therein from said vidicon unit into a facsimile and displaying the facsimile in viewable relation to the occupant of the other of said cockpit portions, and electronic means amplifying said vidicon unit electrical signal and transmitting such signal to said monitor unit, said monitor unit consequently presenting a facsimile display of images included in said gunsight reflector plate display to the occupant of said other cockpit portion thereby providing the airplane with a substantially improved gunnery training capability.

3. The airplane defined in claim 2, wherein one of said displays is substantially collimated and wherein the other of said displays is non-collimated, said gunsight reflector plate display being substantially collimated, and said monitor unit facsimile display being non-collimated.

4. For use in a trainer-type airplane having student and instructor crew stations, the combination comprising: a gunsight for one of said crew stations and which provides a reticle image to be viewed by a person occupying that crew station, beamsplitter optics for intercepting said gunsight reticle image without substantially obstructing the viewable relation between said image and a person occupying the crew station whereat said gunsight is mounted, a vidicon unit mounted in viewing relation to the image intercepted by said beamsplitter optics and converting the intercepted image into a corresponding electrical signal, a monitor unit converting each electrical signal sourced by said vidicon unit into a facsimile of the image intercepted by said beamsplitter optics and displaying said facsimile for viewing by a person occupying the other of said crew stations, and electronic means amplifying said vidicon unit electrical signal and transmitting the amplified signal to said monitor unit, said monitor unit thereby presenting a facsimile display of the gunsight reticle image intercepted by said beamsplitter optics to the person viewing said other monitor unit, said gunsight reticle image and said monitor unit facsimile display being simultaneously viewable by a student and by an instructor occupying said crew stations to provide an improved gunnery training capability.

5. A trainer-type aircraft having, in combination: a first compartment portion for occupancy by a student pilot; a second compartment portion for occupancy by an instructing pilot; a gunsight mounted in said first compartment portion and having a reticle that sources a reticle image which is viewable by a student pilot occupying said first compartment portion; a gunsight transparent reflector plate mounted in viewing relation to said gunsight reticle image and to a target area and having a display which includes an image of said gunsight reticle and an image of said target area, said gunsight reflector plate display being viewable by said student pilot; an optics system comprising a transparent reflector plate and an image reduction lens arrangement which optically intercepts and reduces images included in said gunsight reflector plate display without substantially obstructing the viewable relation between said gunsight reflector plate display and the student pilot occupant of said first compartment portion; a vidicon unit mounted in viewing relation to the images reduced by said optics system and converting said reduced images into a corresponding electrical signal; a monitor unit converting each electrical signal sourced by said vidicon unit into a facsimile display positioned in viewable relation to an instructing pilot occupying said second compartment portion; and television system means amplifying said vidicon unit electrical signal and transmitting the amplified signal to said monitor unit to thereby provide the instructing pilot with a facsimile display which corresponds to said gunsight reflector plate display and improve the training of said student pilot timewise.

6. A trainer-type aircraft having, in combination: a substantially collimated student image display presented in a first cockpit portion, said student image display being comprised of a collimated gunsight reticle image and a substantially collimated target area image superimposed thereon; a non-collimated instructor image display presented in a second airplane cockpit portion distant from said first cockpit portion, said instructor image display being comprised of a facsimile of said gunsight reticle image and said target area image; and closed circuit television means presenting said student image display in facsimile form as said instructor image display, said television system means including a vidicon unit mounted in said first airplane cockpit portion in viewing relation to said student image display and sourcing an electrical signal which corresponds to said student image display, a monitor unit associated with said second airplane cockpit portion and presenting a facsimile display which corresponds to electrical signals received from said vidicon unit, and connecting means amplifying said vidicon unit electrical signal and transmitting said amplified signal to said monitor unit thereby establishing said instructor image display.

(References on following page)

References Cited in the file of this patent

UNITED STATES PATENTS

| | | |
|---|---|---|
| 2,288,871 | Adams | July 7, 1942 |
| 2,359,032 | Gott | Sept. 26, 1944 |
| 2,360,298 | Woodson | Oct. 10, 1944 |
| 2,600,662 | Kurlander | June 17, 1952 |
| 2,725,781 | Banker | Dec. 6, 1955 |
| 2,752,684 | Bentley | July 3, 1956 |
| 2,817,994 | Ehrenhaft | Dec. 31, 1957 |

FOREIGN PATENTS

| | | |
|---|---|---|
| 151,094 | Austria | Oct. 25, 1937 |

OTHER REFERENCES

Publication: "The Air Corps Newest Camera Gun," Haythorne, American Cinematographer, January 1942, pages 11, 37 and 38.